(12) United States Patent
Ludwig

(10) Patent No.: US 8,910,881 B2
(45) Date of Patent: Dec. 16, 2014

(54) AIR HEATER FOR A MOTOR VEHICLE

(75) Inventor: Andreas Ludwig, Penzberg (DE)

(73) Assignee: Webasto AG, Stockdorf (DE)

( * ) Notice: Subject to any disclaimer, the term of this patent is extended or adjusted under 35 U.S.C. 154(b) by 1513 days.

(21) Appl. No.: 11/720,266

(22) PCT Filed: Nov. 23, 2005

(86) PCT No.: PCT/DE2005/002126
§ 371 (c)(1),
(2), (4) Date: Jan. 24, 2008

(87) PCT Pub. No.: WO2006/056191
PCT Pub. Date: Jun. 1, 2006

(65) Prior Publication Data
US 2008/0128525 A1    Jun. 5, 2008

(30) Foreign Application Priority Data
Nov. 26, 2004 (DE) .......................... 10 2004 057 269
Nov. 9, 2005 (DE) .......................... 10 2005 053 514

(51) Int. Cl.
*B60H 1/22* (2006.01)
*F24H 9/18* (2006.01)
*F24H 3/06* (2006.01)
*F24H 3/08* (2006.01)

(52) U.S. Cl.
CPC ...... *B60H 1/2212* (2013.01); *B60H 2001/2278* (2013.01); *F24H 9/1836* (2013.01); *F24H 3/065* (2013.01)
USPC ............ 237/12.3 A; 237/12.3 R; 237/12.3 C; 237/45

(58) Field of Classification Search
CPC ........... B60H 1/00592; B60H 1/00264; B60H 1/2212; B60H 2001/2271; B60H 2001/2278
USPC ............. 237/12.3 R, 12.3 A, 12.3 C, 12.7, 45
IPC .................... B60H 1/22; F24H 3/06, 3/08, 9/18
See application file for complete search history.

(56) References Cited

U.S. PATENT DOCUMENTS 1,630,546 A * 5/1927 Swartz et al. .................... 122/40
2,270,977 A * 1/1942 Spackman ....................... 454/75

(Continued)

FOREIGN PATENT DOCUMENTS

BE    369604    4/1930
CH    222407    7/1942

(Continued)

OTHER PUBLICATIONS

TRANS_DE-10211591-A1.pdf; Machine translation of DE-10211591.*

(Continued)

*Primary Examiner* — Steven B McAllister
*Assistant Examiner* — Daniel E Namay
(74) *Attorney, Agent, or Firm* — Fitch, Even, Tabin & Flannery LLP

(57) ABSTRACT

The invention relates to an air heater (12) to be integrated into an air-carrying housing of a motor vehicle. The invention is characterized in that a flange plate (48) seals at least one exhaust gas discharge (54) from the vehicle interior by means of sealing elements between a fitting site for the air heater (12) and the flange plate (48) and between the air heater (12) and the flange plate (48).

9 Claims, 18 Drawing Sheets

(56) References Cited

U.S. PATENT DOCUMENTS

| | | | | |
|---|---|---|---|---|
| 2,619,160 | A * | 11/1952 | Korshak | 431/162 |
| 2,642,858 | A | 6/1953 | Plesset | |
| 2,990,877 | A * | 7/1961 | Tramontini | 431/266 |
| 3,144,862 | A | 8/1964 | Hottenroth | |
| 3,368,259 | A | 2/1968 | Stevens | |
| 3,724,447 | A * | 4/1973 | Parkhill et al. | 266/200 |
| 3,828,761 | A | 8/1974 | Rich | |
| 3,989,029 | A * | 11/1976 | Friedl et al. | 126/110 B |
| 4,590,888 | A * | 5/1986 | Mosig | 122/149 |
| 4,640,262 | A * | 2/1987 | Lucius | 126/110 B |
| 4,923,033 | A * | 5/1990 | Panick et al. | 181/211 |
| 5,056,501 | A * | 10/1991 | Ida | 126/110 B |
| 5,094,224 | A * | 3/1992 | Diesch | 126/110 R |
| 1,893,270 | A | 1/1993 | Caldwell | |
| 5,417,199 | A * | 5/1995 | Jamieson et al. | 126/110 AA |
| 5,480,093 | A * | 1/1996 | Tochizawa et al. | 237/12.3 C |
| 5,697,546 | A * | 12/1997 | Cicioni | 228/183 |
| 5,727,730 | A * | 3/1998 | Habijanec et al. | 237/12.3 C |
| 5,738,506 | A * | 4/1998 | Mosig et al. | 431/90 |
| 5,803,165 | A | 9/1998 | Shikazono | |
| RE37,009 | E * | 1/2001 | Diesch | 126/391.1 |
| 6,743,012 | B2 * | 6/2004 | Wolf | 431/353 |
| 6,926,206 | B2 * | 8/2005 | Schlecht et al. | 237/12.3 C |
| 7,380,728 | B2 * | 6/2008 | Augenstein et al. | 237/12.3 B |
| 7,434,746 | B2 * | 10/2008 | Schlecht et al. | 237/12.3 C |
| 2002/0117551 | A1 * | 8/2002 | Wolf | 237/12.3 C |
| 2003/0085028 | A1 * | 5/2003 | Galtz | 165/164 |
| 2003/0173413 | A1 * | 9/2003 | Schlecht et al. | 237/12.3 C |
| 2004/0173692 | A1 * | 9/2004 | Blaschke et al. | 237/12.3 C |
| 2005/0260530 | A1 * | 11/2005 | Schlecht et al. | 431/261 |
| 2006/0151623 | A1 * | 7/2006 | Haefner et al. | 237/12.3 C |

FOREIGN PATENT DOCUMENTS

| | | | | |
|---|---|---|---|---|
| DE | 574208 | | 4/1933 | |
| DE | 914597 | | 7/1954 | |
| DE | 1005860 | | 4/1957 | |
| DE | 1401108 | | 3/1969 | |
| DE | 2324649 | | 12/1974 | |
| DE | 7319258 | | 3/1976 | |
| DE | 2628925 | | 1/1978 | |
| DE | 2718215 | | 11/1978 | |
| DE | 8127115 | | 1/1983 | |
| DE | 3136839 | | 3/1983 | |
| DE | 3229365 | | 4/1983 | |
| DE | 3416878 | | 11/1985 | |
| DE | 3509349 | | 9/1986 | |
| DE | 3611092 | | 10/1987 | |
| DE | 3639222 | | 7/1988 | |
| DE | 3734544 | | 5/1989 | |
| DE | 9002588 | | 5/1990 | |
| DE | 4116692 | | 11/1992 | |
| DE | 9116403 | | 11/1992 | |
| DE | 4401800 | C1 * | 3/1995 | B60H 1/22 |
| DE | 4406403 | | 8/1995 | |
| DE | 29510190 | | 8/1995 | |
| DE | 4433210 | A1 * | 3/1996 | B60H 1/22 |
| DE | 19546131 | C1 * | 11/1996 | B60H 1/22 |
| DE | 19613759 | | 10/1997 | |
| DE | 19613760 | | 10/1997 | |
| DE | 19701181 | | 3/1998 | |
| DE | 19734814 | | 1/1999 | |
| DE | 19848169 | | 5/1999 | |
| DE | 10019890 | | 10/2001 | |
| DE | 10112860 | | 9/2002 | |
| DE | 10146610 | | 4/2003 | |
| DE | 10157446 | | 6/2003 | |
| DE | 10211591 | | 10/2003 | |
| DE | 10305383 | | 8/2004 | |
| DE | 10314836 | | 10/2004 | |
| EP | 0654647 | | 5/1995 | |
| EP | 769399 | A2 * | 4/1997 | B60H 1/22 |
| EP | 1970233 | A1 * | 9/2008 | B60H 1/22 |
| FR | 1195426 | | 11/1959 | |
| FR | 1535674 | | 8/1968 | |
| GB | 806049 | | 12/1958 | |
| JP | 63238360 | | 10/1988 | |
| JP | 10308295 | | 11/1998 | |
| JP | 2005-082002 | A | 3/2005 | |
| WO | WO 0035692 | A1 * | 6/2000 | B60H 1/22 |
| WO | WO 02066273 | A1 * | 8/2002 | B60H 1/22 |

OTHER PUBLICATIONS

TRANS_DE-19734814.pdf; Machine Translation of DE-19734814.*

"Trans_DE-10211591-A1.pdf", Machine Translation of DE-10211591-A1, Apr. 20, 2011, EPO.*

Frommer, et al., "Druckgieβ-Technik", 1965, pp. 161-165, Springer-Verlag, Berlin, Heidelberg and New York.

* cited by examiner

AIR HEATER FOR A MOTOR VEHICLE

This application is a 35 U.S.C. §371 National Stage entry of PCT/DE2005/002126, filed Nov. 23, 2005, which claims priority from German Patent Application Nos. DE 10 2004 057 269.0, filed Nov. 26, 2004 and DE 10 2005 053 514.3, filed Nov. 9, 2005, the contents of which are herein incorporated by reference.

The invention relates to a heat exchanger for an air heating apparatus for integration into a housing which guides air.

Currently, fuel-driven supplemental heating units for vehicles (particularly trucks or utility vehicles the like) are generally housed separately from the vehicle's inherent onboard heating and air conditioning unit. Such supplemental heating units are provided in the form of, e.g., air heating apparatuses, which are utilized as heaters to provide supplemental heating, and/or to provide heating under stationary circumstances (when the vehicle is parked).

For some time, attempts have been made to integrate air heating devices into the inherent onboard heating and air conditioning apparatus of a vehicle. This would provide savings in space occupied and in component parts (avoids redundancy). An example of such an apparatus is disclosed in DE 10211591 A1.

The quality of the functioning and the economic efficiency of the air heating apparatus, and the safety and reliability of the combination, depend substantially on the location of the apparatus integrated into the inherent onboard heating and air conditioning system, and on the engineering design and construction characteristics of said air heating apparatus. It is important to fully take into account the set of problems associated with the integration of the air heating apparatus into the system of the inherent onboard heating and air conditioning system, and to provide solutions for these problems, in order to achieve a successful integrated system.

Some of the engineering problems concern means of minimizing the ordinarily high weight of the heat exchanger body. Such heat exchanger bodies are customarily fabricated by pressure casting. The greater the weight of the heat exchanger body, the more robust the housing in which it is mounted on the vehicle must be.

Under the design schemes according to the state of the art, air is caused to flow around the heat exchanger in a direction which is perpendicular to the longitudinal direction (axial direction) of the heat exchanger. Such transverse flow results in high creation of vortices and turbulent flow of the air, and thus high energy losses in the flow (high flow pressure drop). If one seeks to address this by increasing the space available around the heat exchanger, one will need more installation space to accommodate the integrated heating and air conditioning system. Accordingly, it is rational to seek solutions which improve the flow behavior and heat transfer with regard to the heat exchanger.

It is also desirable to utilize already present components of the air heating apparatus in the solution by which said apparatus is integrated into the inherent onboard heating and air conditioning system. Accordingly, the heat exchanger employed should have an adaptable design, so as to be utilizable with a variety of types and models of air heating apparatuses. The means of fabrication of the heat exchanger should be similarly adaptable.

There are two heat transfer processes—that from the heat exchanger to the air sought to be heated, which air flows around the exterior of the heat exchanger, and that from the combustion gases to the heat exchanger.

By improving the latter heat transfer, one can have greater freedom of design of the structure of the heat exchanger as a whole.

Another important requirement placed on the air heating apparatus is that it be configured so as to avoid any possible penetration of combustion gases into the air which flows around the air heating apparatus. Another requirement is to provide means whereby the combustion air used for the combustion is drawn in from the space outside the motor vehicle, and in particular not from the interior space of the vehicle. Thus it would be advantageous to provide improvements in the arrangement of the various connecting fittings and nipples employed with known air heating apparatuses.

The underlying problem of the present invention was to devise appropriate solutions to solve the above-described problems at least partially, particularly the connecting fittings and the like of the air heating apparatus.

This underlying problem is solved by the features of the independent claims [sic].

Advantageous embodiments of the invention are set forth in the dependent claims.

According to the invention, improvements are provided in the general type of air heating apparatus in that a flange plate is provided which provides a seal of at least one exhaust gas withdrawal means with respect to the vehicle interior space, by means of sealing elements between a mounting location for the air heating apparatus and the flange plate, and between the air heating apparatus and the flange plate.

Such a flange plate provides means of minimizing the path of the exhaust gases to the external air, and in so doing makes it less likely that penetration will occur.

In this connection it is particularly useful that the sealing means for sealing the flange plate with respect to the air heating apparatus are disposed (effected) between the flange plate and the connecting nipple (or other connecting fitting) of the air heating apparatus.

It is also possible for the flange plate to provide seal means between the combustion air feed passage and the interior space of the vehicle. This provides assurance that the combustion air will be drawn from outside the vehicle.

It is also advantageous if the flange plate has a pass-through opening for fuel supply. In this way, all fittings and nipples through which gases and liquids are passed are disposed in the region of the flange plate, which is advantageous for integrating the air heating apparatus into the entire system design.

This overall engineering design concept is described in more detail hereinbelow, with the features relating to the configuration of the inventive air heating apparatus being combined with numerous other features of the air heating apparatus, of the heat exchanger, and of fabrication methods for heat exchangers, to provide advantageous characteristics.

It may be provided that the heat exchanger for integration into an air-guiding housing, particularly a housing of an inherent onboard heating and air conditioning system of a motor vehicle, has a heat exchanger body and a heat exchanger base, which heat exchanger body and heat exchanger base are fabricated separately.

This affords flexibility with regard to the various possible structures and configurations, and the various possible fabrication methods. If the heat exchanger base is fabricated separately from the heat exchanger core, variants in fabrication methods and steps, for the heat exchanger core, may be introduced. The overall weight of the heat exchanger can be reduced by the appropriate choice of fabrication methods.

For similar reasons, it may be advantageous to fabricate the heat exchanger head separately. In particular, such a heat exchanger head may be already available; wherewith separate fabrication is a beneficial choice. Depending on the geometric form of the burner head or of the burner unit, it may even be possible to completely eliminate a heat exchanger head.

The heat exchanger body may have a heat exchanger core and heat transfer surfaces, and the heat exchanger core and the component parts which provide the heat transfer surfaces may be at least partially separately fabricated. These possible separate fabrication processes are advantageous as means of weight reduction and means of providing increased variability with regard to the configuration of component parts and with regard to fabrication methods.

In this connection it is particularly useful if the component parts which provide the heat transfer surfaces are applied to the heat exchanger core by press-forming or by a shrink-forming method. In order to join the heat exchanger head and the heat exchanger base to the heat exchanger core with gas-tight joints, preferably welding, brazing, adhesive bonding, and/or screwing (or screw fastening) are employed. There may be, e.g., heat transfer surfaces of the heat exchanger which generally have a disc-like or flange-like shape, wherewith press-forming or shrink-forming may be advantageous for fixing them to the heat exchanger core. In this way, one has additional opportunities for variability of the fabrication methods.

It is possible to fabricate the heat exchanger core by pressure casting. In general, such cast parts are somewhat heavy; however, cost savings are achieved.

It is possible to provide the heat exchanger core with an interior profile. This is a means of increasing the interior heat transfer surface area of the heat exchanger, and of decreasing the overall installation space required.

The heat exchanger core may be manufactured by extrusion. Extrusion generally allows for thinner walls in the heat exchanger compared to a core fabricated by pressure casting, in particular since extrusion does not require the configuration to include a mold removal incline; accordingly, reductions in overall weight can be achieved, as well as thinner features (vanes etc.) in the interior profile, and thereby increased heat transfer surface area of the interior surfaces. An extrusion process makes it possible to incorporate geometric features which facilitate attachment of the heat exchanger head, burner, heat exchanger base, etc., e.g. in the form of holes in the core which may be threaded.

It may be provided that it [sic] has a cross sectional geometry which tends to reduce flow resistance.

For example, the cross sectional geometry may be oval or ovaloid.

Alternatively, the cross sectional geometry may resemble that of an airfoil.

Alternatively, it may be advantageous if the cross sectional geometry is generally diamond-shaped.

The heat exchanger body may have a plurality of rods on its exterior surface, which rods provide heat transfer surface. This configuration can contribute a very large surface area for heat transfer to the air which is to be heated.

It may be advantageous for the heat exchanger body to have a heat exchanger core, and for the above-described plurality of rods to be applied to said core at least partially by means of a separate component part (or parts).

The heat exchanger body may have a heat exchanger core wherewith at least part of (some of) the plurality of rods have a unit construction with the heat exchanger core. The provision of the rods on one or more separate component parts, on the one hand, and direct fixing of the rods to the core (in a unit construction or the like), on the other hand, each has its own advantages; e.g. the use of separate component parts provides design flexibility, whereas direct fixing (e.g. unit construction) allows a simple fabrication method.

The heat exchanger body may have a plurality of undular ribs on its exterior surface, which ribs contribute heat transfer surface area.

In this connection, it is possible that the heat exchanger body has a heat exchanger core wherewith the plurality of undular ribs are applied to the heat exchanger core at least partially (e.g. at least some of them are applied) via a separate component part or as individual separate parts.

In a configuration in which the heat exchanger body has a heat exchanger core, the plurality of undular ribs may be at least partly (e.g. at least some of them may be) fabricated in a unit construction with the heat exchanger core. It is advantageous if the means of fastening such heat transfer surfaces are not screw means or the like but rather comprise welding, brazing, shrink-forming, or press-forming, of single ribs or the like or groups of such ribs, or subassemblies comprising such ribs, which are slid over, e.g., the heat exchanger core.

The heat exchanger body may be comprised of a plurality of heat exchanger body modules. This arrangement provides variability, as to the configuration and size of the heat exchanger.

It may be particularly advantageous to fabricate the heat exchanger body modules by pressure casting.

If it is desired to use a fully customary pressure casting process for the heat exchanger, modular construction is desirable, because the mold-removal inclines required are short and thereby minimally intrusive.

Regarding modular construction, it may be advantageous if the heat exchanger body modules are at least to some extent identical. This allows for identical tool components, e.g. in the case of pressure molding.

To some extent, at least, the heat exchanger body may be fabricated from two molded pieces (molded masses) (so-called "cores") in a pressure molding process, wherewith the two pieces are removed from the mold in opposite directions. This is another means of reducing the maximum lateral extent of the mold removal inclines and thereby reducing overall weight.

In connection with an air heating apparatus for integration into an air guiding housing, which heating apparatus has a heat exchanger with a heat exchanger body, the air heating apparatus may be provided with flow-guiding elements wherewith, when combustion is carried out in a combustion space which is at least partly disposed in the interior of the heat exchanger, hot gases which are generated are deflected toward the interior side of the heat exchanger body. In this way, the hot gases produced in the combustion can be more efficiently distributed over the interior side of the heat exchanger.

In this connection it is advantageous if the flow guiding elements are in the form of a helical vane, systems of vanes or the like (which may employ undular geometries or the like), baffle plates, and/or perforated tubes. These and numerous other possibilities improve overall heat transfer.

It is an underlying concept of the invention that an air heating apparatus can be integrated into an onboard heating and air conditioning system of a vehicle (particularly a truck or utility vehicle) in an economical and functionally advantageous manner. In implementation of this concept, a heat exchanger has been devised according to the invention which has high variability and adaptability, and has advantageous weight, flow, and heat transfer characteristics. Particularly advantageous is the spatial arrangement of the supply lines and exhaust gas lines and their fittings and the like, whereby air and exhaust gas flows in undesired flow paths are prevented but favorable conditions are created for the described advantageous configuration and features of the heat exchanger.

The invention will now be explained further based on particularly preferred exemplary embodiments, with reference to the accompanying drawings.

In the description of the drawings which follows hereinbelow, like or similar components have been assigned like reference numerals.

Figure 1:
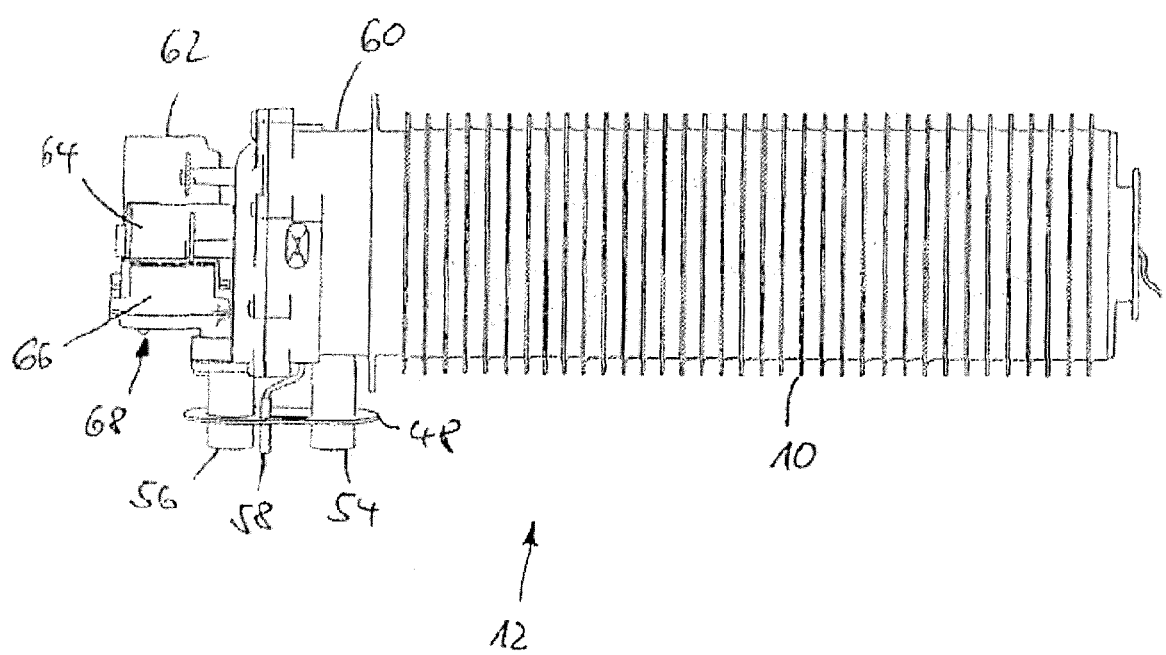
FIG. 1 is a perspective view of an air heating apparatus.

FIG. 1 is a perspective view of an air heating apparatus 12, comprised of a heat exchanger 10 mounted on a burner unit 60, and further comprised of a burner head 62. The burner head 62 contains a blower motor 64 and a control device 66 which comprise the essential components of a combustion air blower unit 68. The burner head 62 also has a nipple 56 for supply of combustion air. The burner unit 60 has a fuel supply line 58 and a nipple 54 for withdrawal of exhaust gas The exhaust gas nipple 54 bears a flange plate 48 which has openings for the fuel supply line 58 and the combustion air supply line 56. The function of the flange plate 48 will be described in more detail infra with reference to FIG. 19. The heat exchanger 10 mounted on the burner unit 60 has a rib structure on its exterior perimeter, so as to increase the surface area for heat transfer to the air flowing over the heat exchanger 10. The air heating apparatus 12 preferably is oriented with respect to the air stream of the air which is to be heated, such that the latter approaches and leaves in a direction perpendicular to the axis of the heat exchanger 10, as said air flows around and past said heat exchanger 10.

Figure 2:
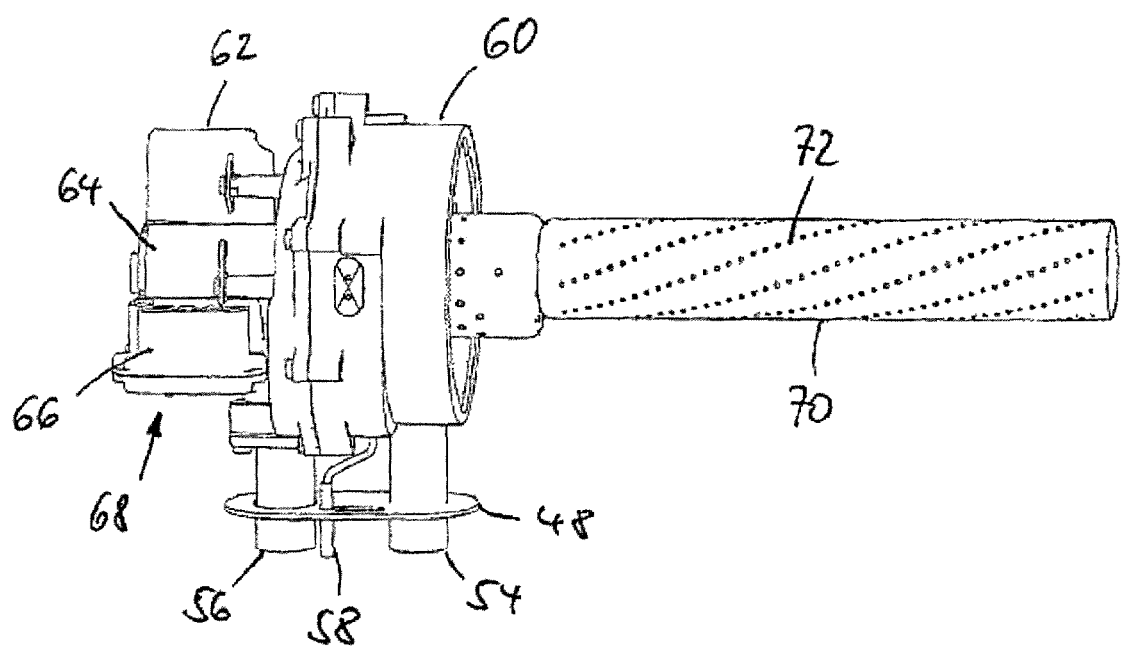
FIG. 2 is a perspective view of an air heating apparatus sans heat exchanger.

FIG. 2 is a perspective view of an air heating apparatus 12, sans heat exchanger. Here the burner head 62 and burner unit 60 are more clearly visible. The burner unit 60 comprises a combustion tube 70 in which hot gases are produced with flame formation; heat from the hot gases is transferred to the heat exchanger 10 (which is not shown in FIG. 2). To enable the hot gases to reach the heat exchanger, a plurality of holes 72 are provided in the wall of the combustion tube 70.

Figure 3:
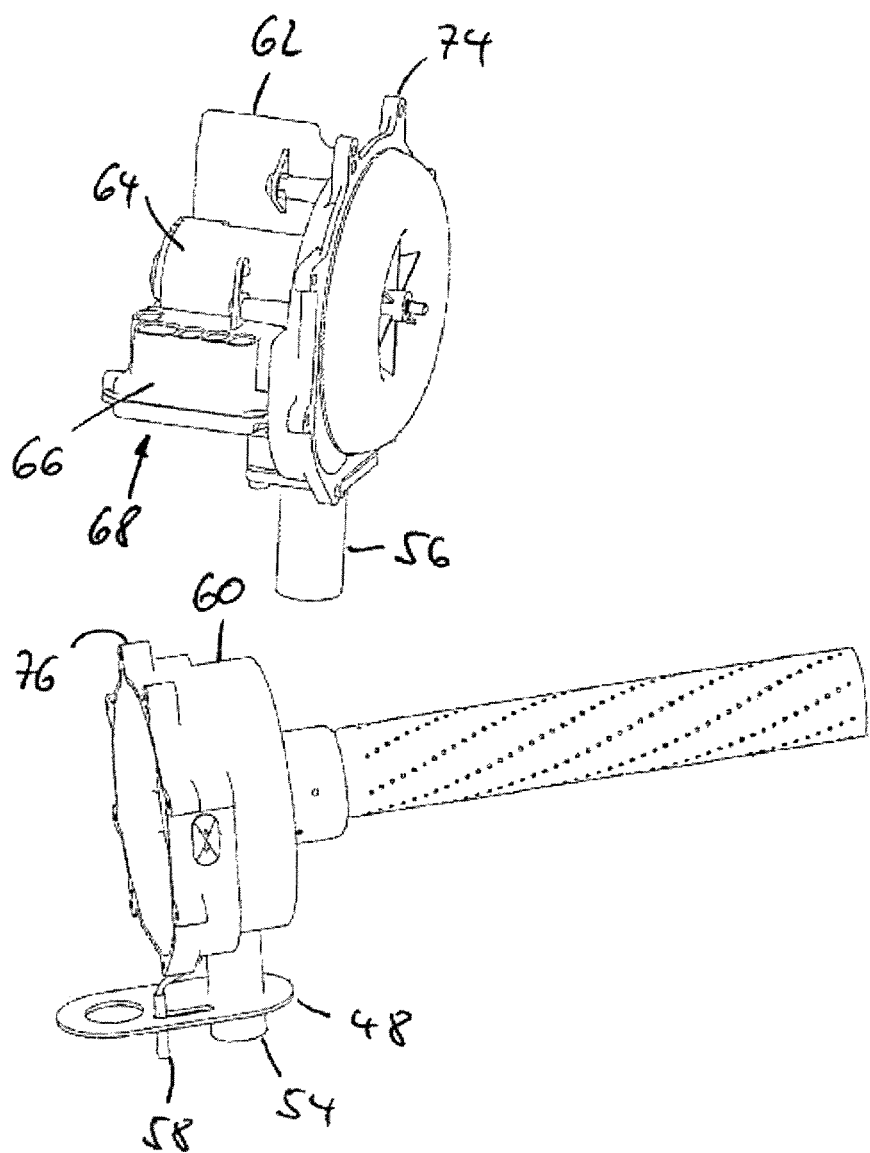
FIG. 3 is a perspective view of an air heating apparatus sans heat exchanger, disassembled into two subassemblies, namely the burner head and the burner unit.

FIG. 3 is a perspective view of an air heating apparatus 12 sans heat exchanger, disassembled into two subassemblies, namely the burner head and the burner unit. This Figure shows clearly how the burner head 62 [lit., "60"] is connected to the burner unit 60 via a flange joint (74, 76). Further, it is seen clearly in this Figure that the flange plate 48 is fixedly joined to the exhaust gas nipple 54, whereas a pass-through opening for the combustion air line 56 is provided in the flange plate.

Figure 4:
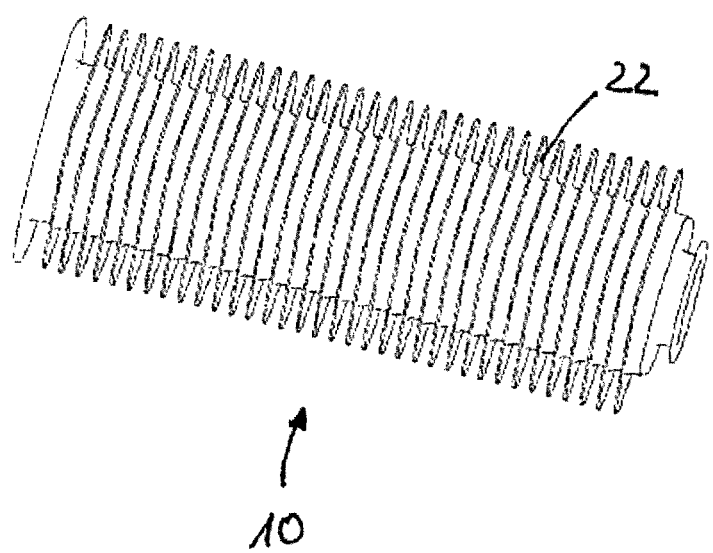
FIG. 4 is a perspective view of a heat exchanger.

FIG. 4 is a perspective view of a heat exchanger 10. The ribbed structure can be seen, which provides heat transfer surfaces 22.

Figure 5:
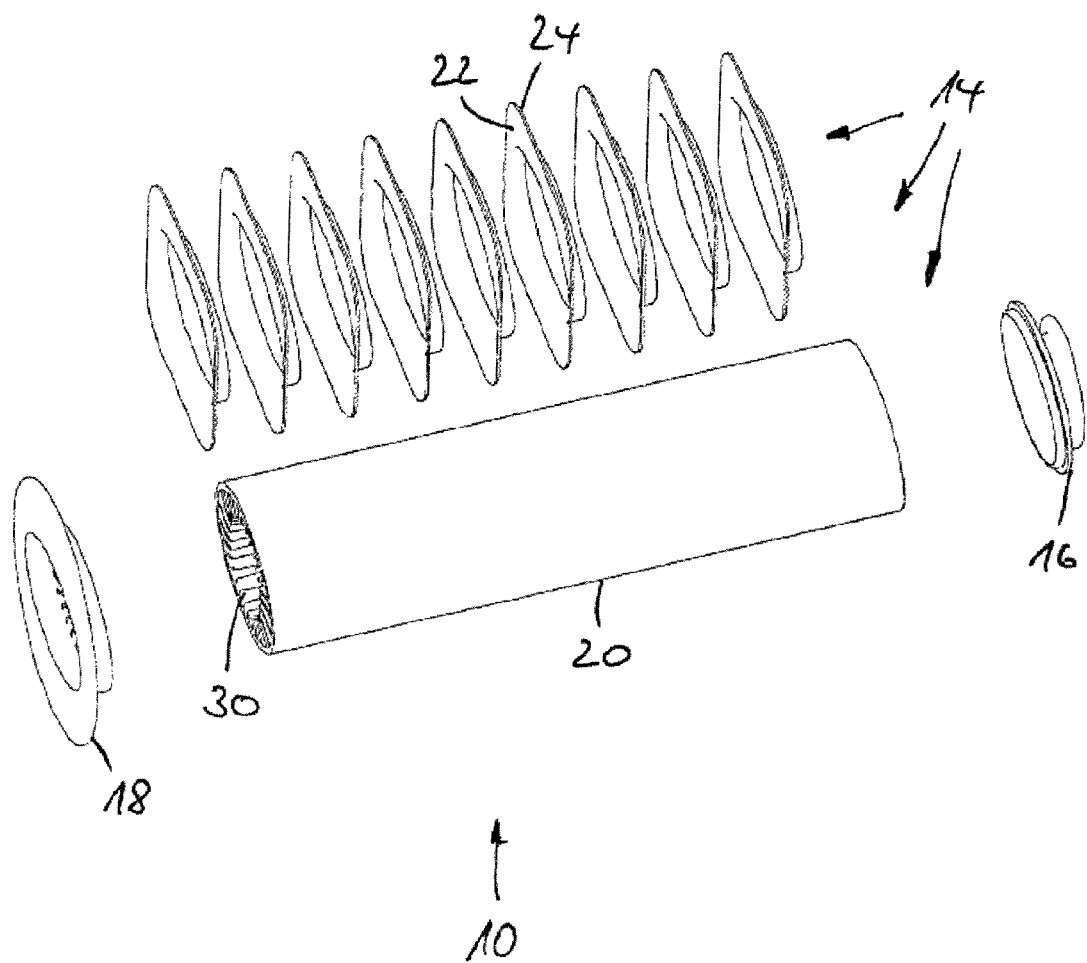
FIG. 5 is a perspective view of individual components of a heat exchanger.

FIG. 5 is a perspective view of individual components of a heat exchanger 10. It is seen that the heat exchanger 10 has a plurality of component parts. It is comprised of a heat exchanger core 20, components 24 with heat transfer surfaces 22, a heat exchanger base 16, and a heat exchanger head 18. Depending on the configuration of the burner head 62 and/or the burner unit 60, the heat exchanger head 18 may be unnecessary. Inside the heat exchanger core 20 an interior profile 30 is provided which facilitates heat transfer from the hot gases generated in the combustion tube 70 to the heat exchanger 10. The heat exchanger head 18 and heat exchanger base 16 may be fabricated by various techniques, e.g. deep drawing, pressure molding, or machining. The individual component parts can then be joined by various joining techniques, e.g. welding, brazing, adhesive bonding, and/or screwing or screw fastening. Because combustion gases are present inside the heat exchanger 10, it is important that gas-tight joints be provided between the heat exchanger head 18, heat exchanger core 20, and heat exchanger base 16. In the context of the present disclosure, the heat exchanger core and the attached components 24 with heat transfer surfaces 22 are commonly designated with the reference numeral 14.

Figure 6:
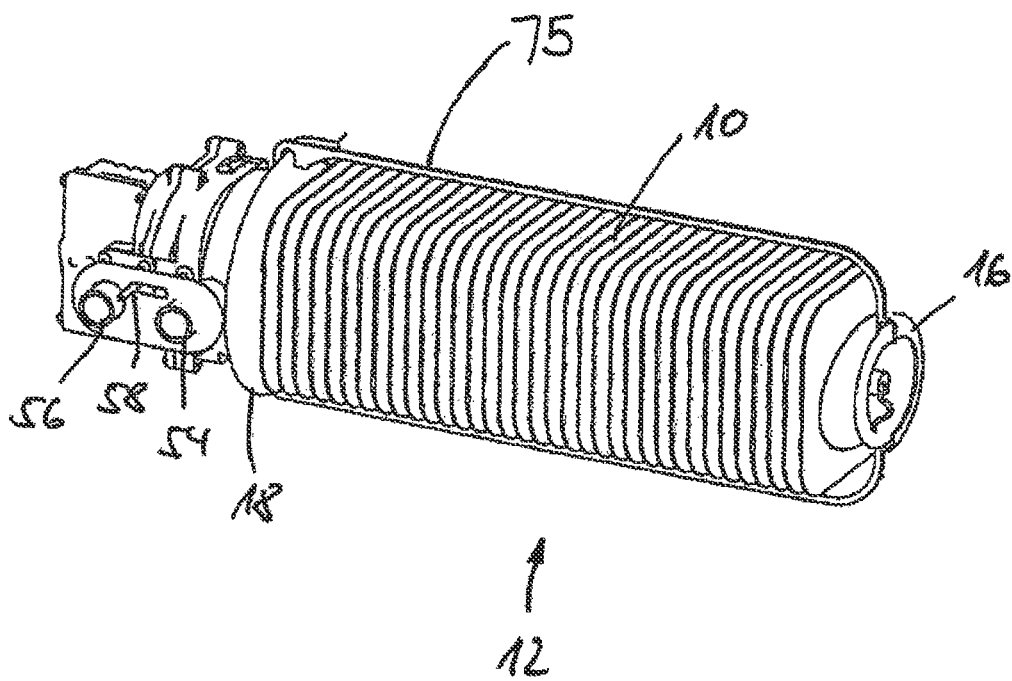
FIG. 6 is a perspective view of an air heating apparatus with housing attachment means applied.

FIG. 6 is a perspective view of an air heating apparatus 12 with housing attachment means 75 applied, to facilitate attachment of the air heating apparatus to a surrounding housing. The said housing attachment means 75 are attached to the air heating apparatus 12 via the heat exchanger head 18 and the heat exchanger base 16.

Figure 7:
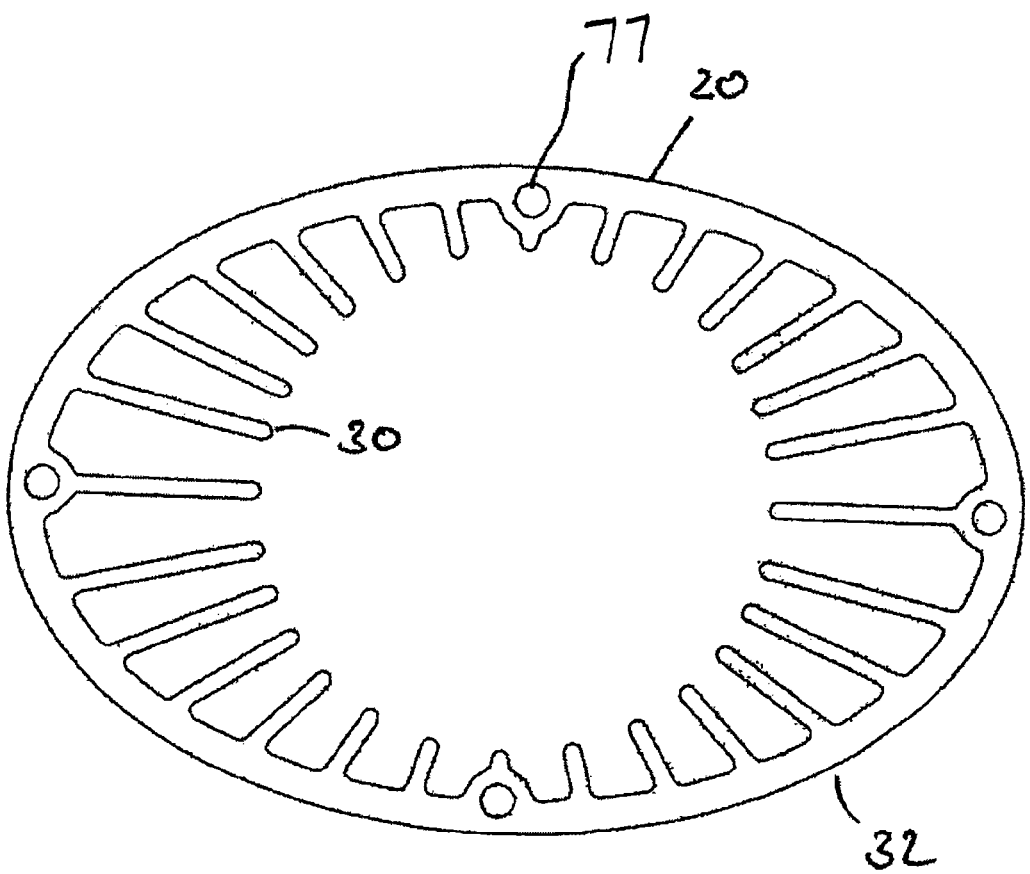
FIG. 7 is a cross sectional view of a heat exchanger core having an oval cross section.

FIG. 7 is a cross sectional view of a heat exchanger core having an oval cross section. The heat exchanger core 20 has an interior profile 30. The finer the configuration of this interior profile 30, the greater the surface available for heat transfer from the hot gases to the heat exchanger 10. A heat exchanger core 20 of the type illustrated can be fabricated by means of, e.g., an extrusion process. Such a process allows for thin walls, with the advantage of low weight and the provision of a large heat transfer surface area. The heat exchanger core 20 has means of fastening, e.g. openings 77, to facilitate attachment of the other components. The oval cross sectional geometry (32) of the heat exchanger 20 can improve flow characteristics for the air which is to be heated, which air flows around and past the heat exchanger 20. Because the heat exchanger base 16 is fabricated separately from the heat exchanger core 20, the fabrication of the core 20 is made easier.

Figure 8:
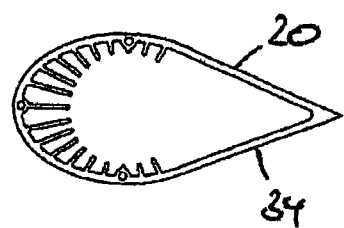
FIG. 8 is a cross sectional view of a heat exchanger core having a generally airfoil-shaped (lobe-shaped) cross section.

FIG. 8 is a cross sectional view of a heat exchanger core having a generally airfoil-shaped (lobe-shaped) cross section.

Figure 9:
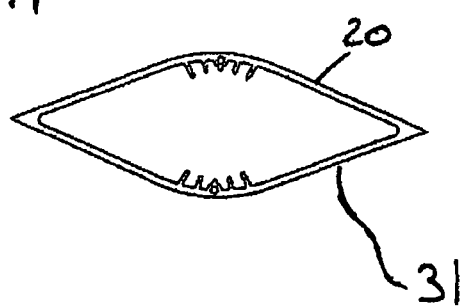
FIG. 9 is a cross sectional view of a heat exchanger core having a generally diamond-shaped cross section.

FIG. 9 is a cross sectional view of a heat exchanger core having a generally diamond-shaped cross section. The cross sectional geometries illustrated (airfoil-shaped 34 and diamond shaped 31) are merely examples of numerous possible shapes which are favorable for the flow around the exterior of the heat exchanger [core] 20.

Figure 10:
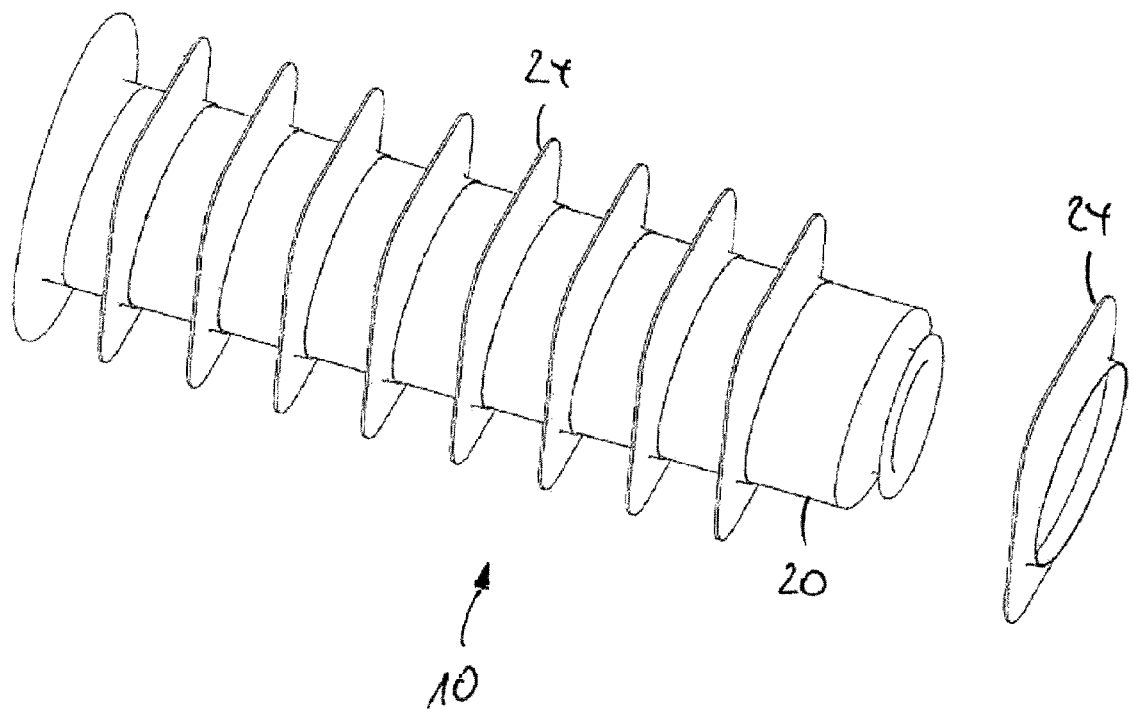
FIG. 10 is a perspective view of a heat exchanger, showing separately an individual heat transfer component.

FIG. 10 is a perspective view of heat exchanger 10, showing separately an individual heat transfer component 24. Each component 24 is fabricated separately from the heat exchanger core 20. The components 24 which are shown mounted on the heat exchanger core 20 are fixed to said core by sliding them over the core and then applying, e.g., press-forming or a shrink-forming technique; said components 24 are attached individually or in groups or subassemblies.

Figure 11:
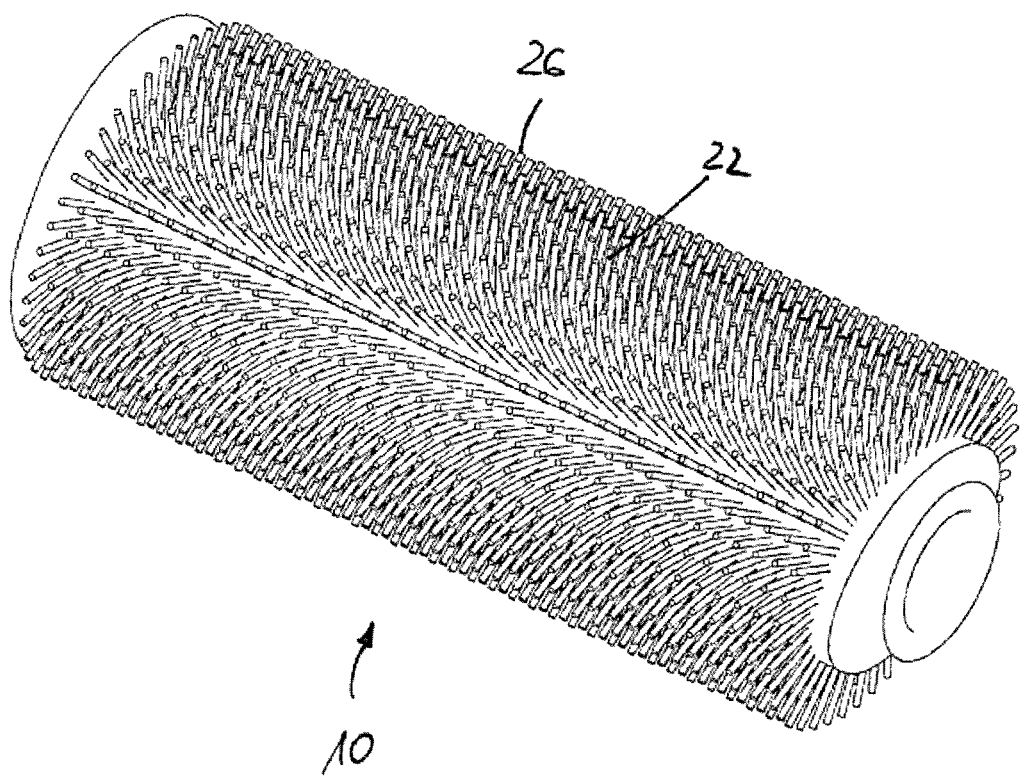
FIG. 11 is a perspective view of a variant embodiment of a heat exchanger.

FIG. 11 is a perspective view of a variant embodiment of a heat exchanger 10 which has a very large surface area for transferring heat to the air flowing around it. This large surface area is achieved by a heat transfer surface 22 comprised of a plurality of rods 26.

Figure 12:
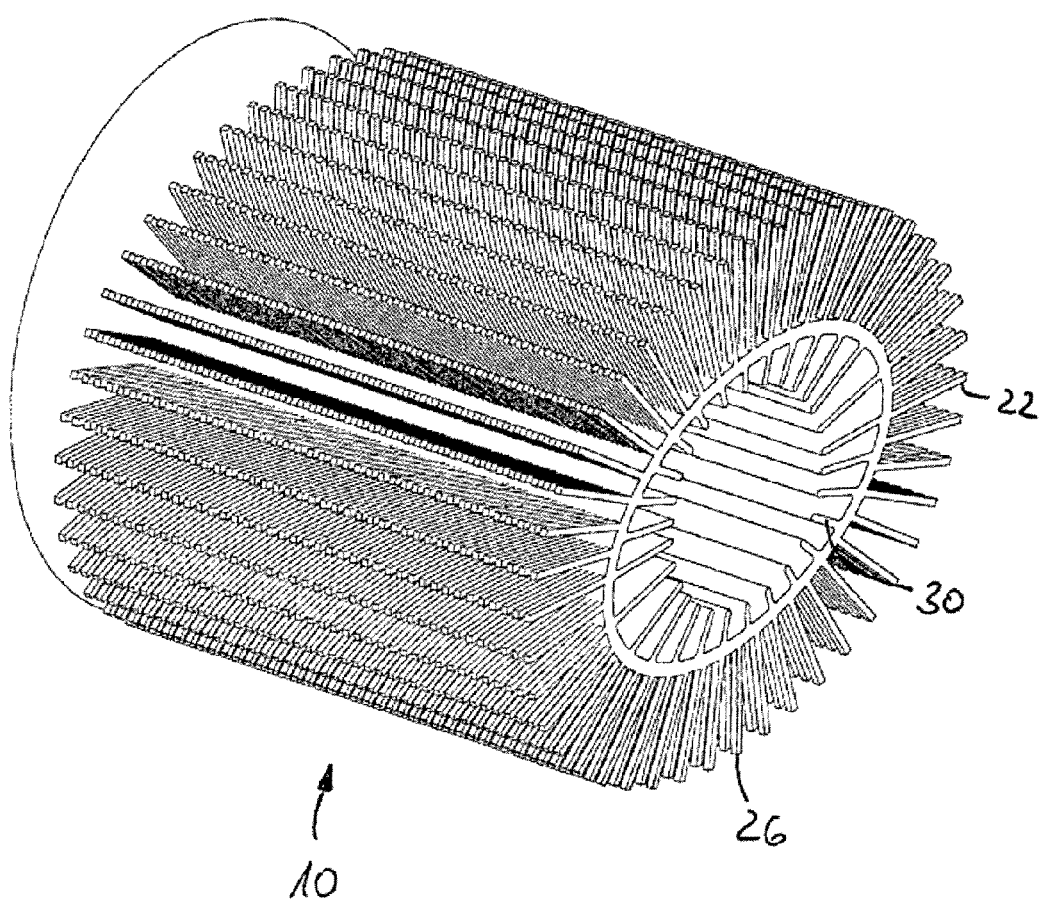
FIG. 12 is a perspective view of another variant embodiment of a heat exchanger.

FIG. 12 is a perspective view of another variant embodiment of a heat exchanger, having an even larger heat transfer surface area, provided by a very large number of rods 26 which afford the heat transfer surface 22. The interior profile 30 may also be seen, in the interior of the heat exchanger. In the embodiment illustrated, some elements of this interior profile comprise extensions of features on the exterior profile, namely the exterior rods 26; or correspond to extensions of rows of such exterior rods. The rods 26 of the embodiments illustrated in FIGS. 11 and 12 may be applied to the exterior surface of the heat exchanger as separate components therefrom, or may be formed, e.g., from an extruded profile by press-forming or machining.

Figure 13:
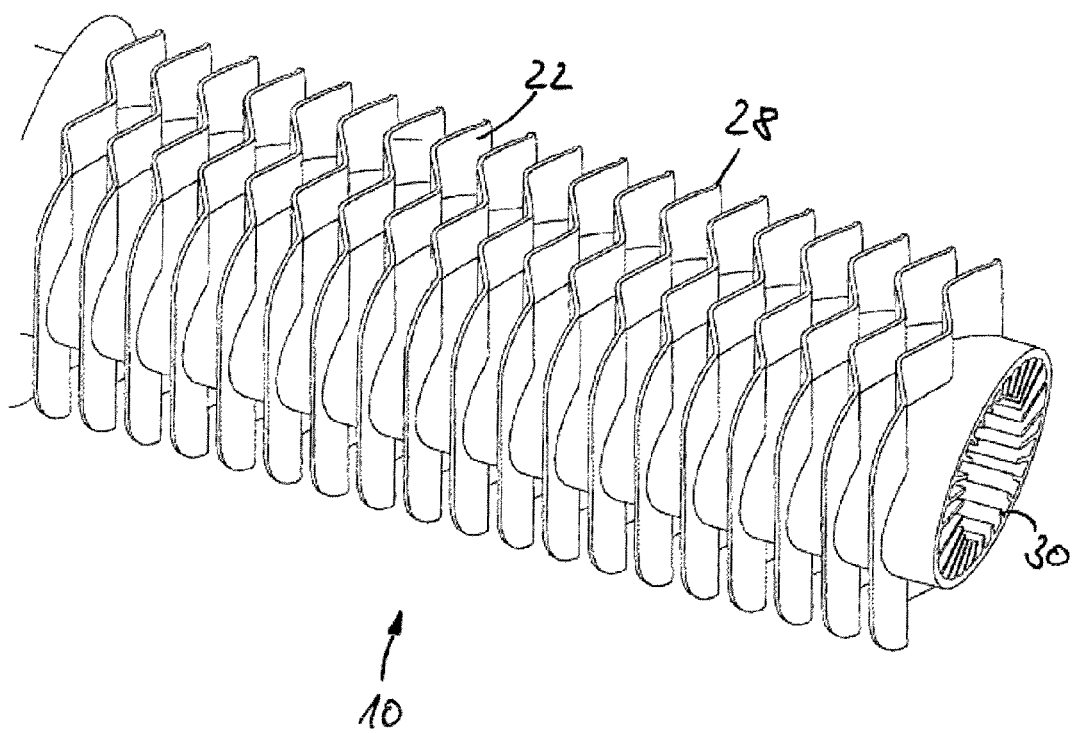
FIG. 13 is a perspective view of yet another variant embodiment of a heat exchanger.

FIG. 13 is a perspective view of yet another variant embodiment of a heat exchanger 10. The components 28 which provide the heat transfer surface 22 of the heat exchanger 10 are undular ribs, which promote heat transfer.

Figure 14:
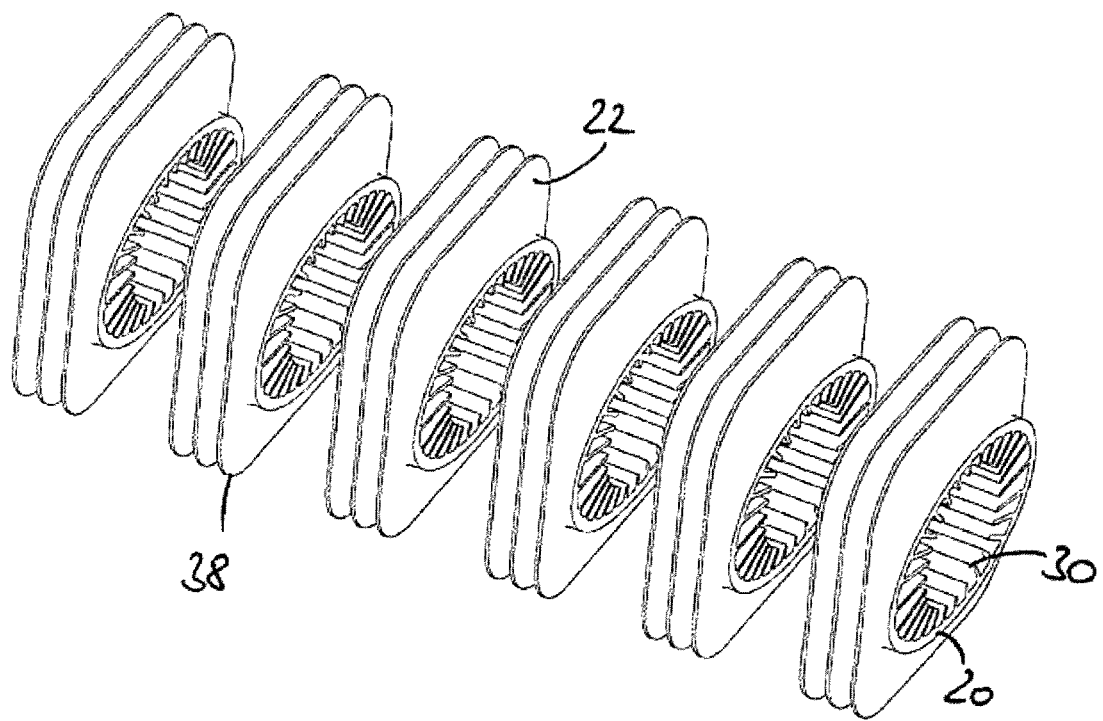
FIG. 14 is a perspective view of a plurality of heat exchanger body modules which are mutually identical.

FIG. 14 is a perspective view of a plurality of heat exchanger body modules 38 which are mutually identical. This embodiment is particularly interesting in that it is amenable to fabrication by pressure casting, which may be desired in some cases (in comparison to extrusion, mentioned above). A drawback of pressure casting is that inherently the thicknesses of walls may be greater as a result of mold removal angles (mold removal inclines). In the exemplary embodiment illustrated, the axial length of each of the heat exchanger body modules 38 is short, wherewith the said thicknesses can be kept small because the mold removal inclines are correspondingly short.

Figure 15:
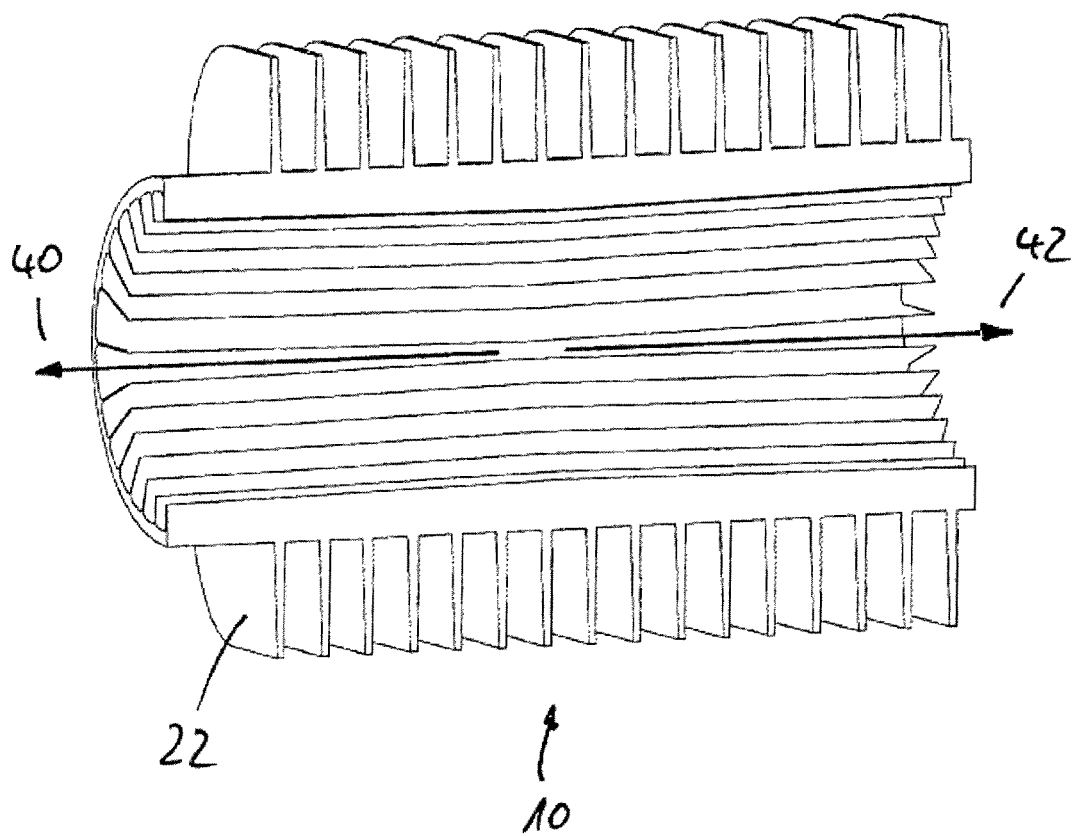
FIG. 15 is a perspective cutaway view of a heat exchanger.

FIG. 15 is a perspective cutaway view of a heat exchanger 10. This embodiment enables another casting process in which mold removal inclines are kept short. The heat exchanger 10 is produced by pressure molding and has two heat exchanger cores which are removed from the mold in two opposite removal directions (40, 42); with this arrangement, the thicknesses of walls can be kept small.

Figure 16:
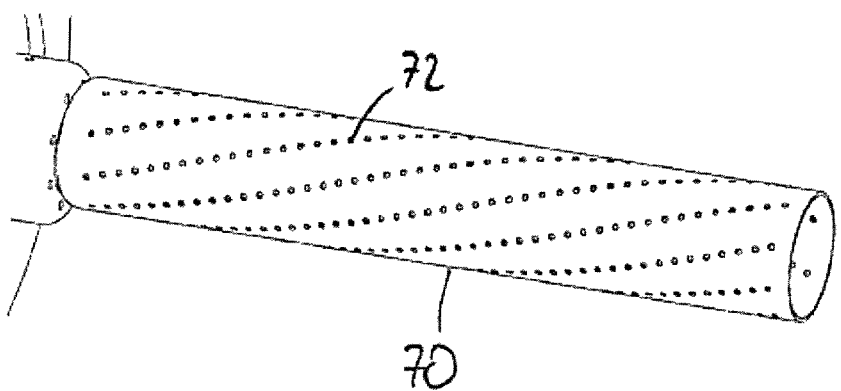
FIG. 16 is a perspective view of a combustion tube.
Figure 17:
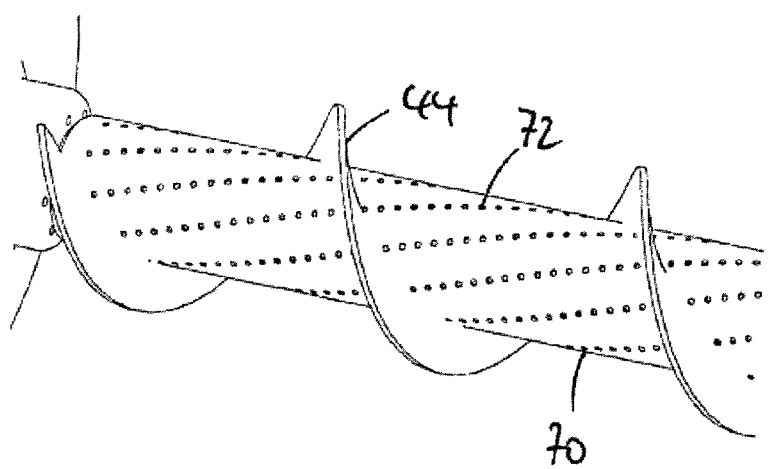
FIG. 17 is a perspective view of a variant embodiment of a combustion tube.
Figure 18:
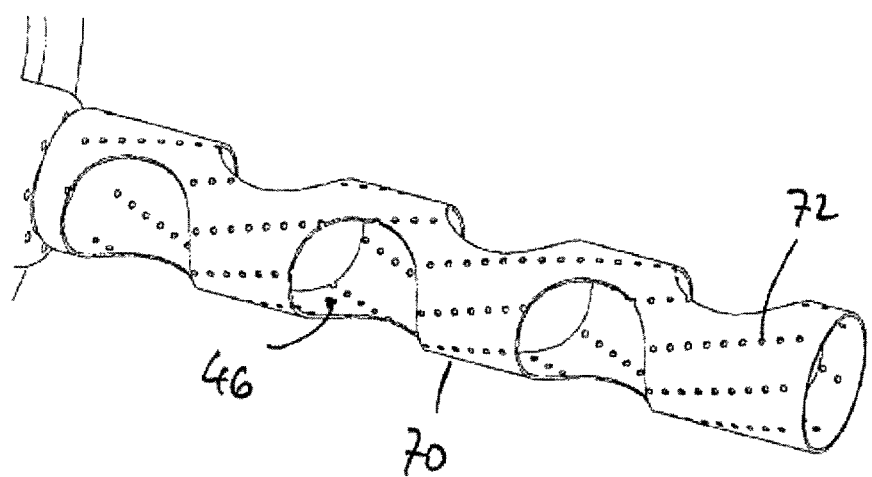
FIG. 18 is a perspective view of another variant embodiment of a combustion tube.

FIGS. 16, 17, and 18 are perspective views of three different combustion tubes 70. In order to provide for good and uniform transfer of heat to the interior surface of the heat exchanger from the hot gases generated in the combustion, with maximally efficient distribution [sic], it is advantageous to employ flow guiding means to deflect the hot gases disposed inside the heat exchanger 10 against the interior profile (vanes or the like) 30 [(FIG. 7)] and against the interior wall. In FIG. 17, the flow guiding element 44 has a helical configuration. Alternatively, the flow guiding elements may be in the form of vanes or the like (and may employ undular geometries or the like), baffle plates, and perforated tubes; as shown in FIG. 18, such a perforated tube may have a plurality of [wider] openings 46 in addition to the pattern of openings 72.

Figure 19:
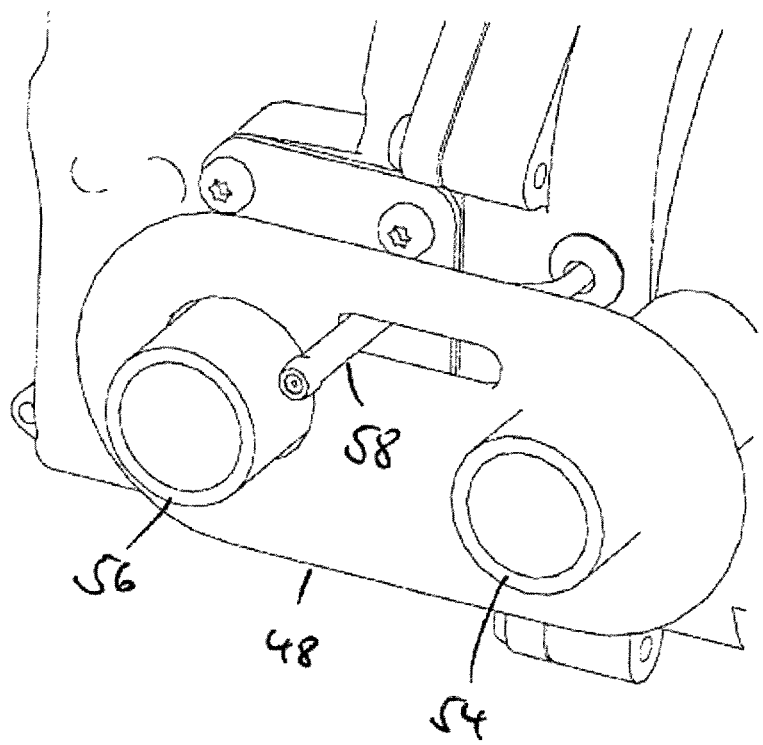
FIG. 19 is a perspective view of a connecting region of an air heating apparatus with a flange plate.

FIG. 19 is a perspective view of a connecting region of an air heating apparatus with a flange plate 48. The flange plate 48 serves for mounting of the air heating apparatus 12 [lit., "10"] to the body of a vehicle or to a housing or other component which in turn is mounted to the vehicle body. In order to provide for venting of the exhaust gases to the surroundings and intake of combustion air from the surroundings, the flange plate 48 is sealingly connected to the air heating apparatus 12 and [sic] to the mounting location (e.g. the vehicle body). The sealing may employ sealing rings, for example.

The features of the invention disclosed in the preceding description, the drawings, and the claims may be essential elements of the invention individually or in any combination.

The invention claimed is:

1. An air heating apparatus for integration into an air-guiding housing for a vehicle with an interior space, comprising:
   a combustion air supply line assigned to a burner head and at least one nipple assigned to a burner unit for withdrawal of exhaust gas; and
   a flange plate which provides a seal of the at least one exhaust gas nipple which is fixedly joined to the flange plate and extends through the flange plate with respect to the vehicle interior space, by means of sealing elements between a mounting location for the air heating apparatus and the flange plate, and between the air heating apparatus and the flange plate;
   wherein, the flange plate seals the combustion air supply line with respect to the interior space of the vehicle, and the burner head with the combustion air supply line are directly adjacent to but separable from the flange plate, while the burner unit with the at least one exhaust gas nipple and a fuel supply line, which extends through the flange plate, assigned to the burner unit remain connected with the flange plate.

2. The air heating apparatus of claim 1, wherein the sealing elements for sealing the flange plate with respect to the air heating apparatus are disposed (effected) between the flange plate and a connecting nipple (or other connecting fitting) of the air heating apparatus.

3. The air heating apparatus of claim 1, wherein the flange plate has a pass-through opening for fuel supply.

4. An air heating apparatus for integration into an air-guiding housing for a vehicle with an interior space, comprising:
   at least one nipple assigned to a burner unit for withdrawal of exhaust gas; and
   a one-piece flange plate which provides a seal of the at least one exhaust gas nipple, the at least one exhaust gas nipple being fixedly joined to the one-piece flange plate and extending through the one-piece flange plate with respect to the vehicle interior space, by means of sealing elements between a mounting location for the air heating apparatus and the flange plate, and between the air heating apparatus and the flange plate.

5. The air heating apparatus of claim 1, wherein the combustion air supply line passes through an opening in the flange plate.

6. The air heating apparatus of claim 1, wherein the combustion air supply line and the at least one exhaust gas nipple are parallel to each other.

7. The air heating apparatus of claim 1, wherein the burner unit includes a burner tube, the burner tube having a hollow interior.

8. The air heating apparatus of claim 4, further including a combustion air supply line passing through an opening in the flange plate.

9. The air heating apparatus of claim 4, wherein the burner unit includes a burner tube, the burner tube having a hollow interior.

* * * * *